United States Patent [19]

Hicks

[11] Patent Number: 4,531,753
[45] Date of Patent: Jul. 30, 1985

[54] METHOD AND APPARATUS FOR VARYING A VEHICLE WHEELBASE

[76] Inventor: W. Glen Hicks, 809 Kennon St., Minden, La. 71055

[21] Appl. No.: 549,235

[22] Filed: Nov. 4, 1983

[51] Int. Cl.³ .................... B60G 5/06; B62D 27/04; B60P 1/04
[52] U.S. Cl. .................................................. 280/80 B
[58] Field of Search .............................. 280/80 B, 638

[56] References Cited

U.S. PATENT DOCUMENTS

| | | | |
|---|---|---|---|
| 2,682,419 | 6/1954 | Wolf | 280/80 B |
| 3,152,837 | 10/1964 | Margala | 280/80 B |
| 4,125,198 | 11/1978 | Landoll | 280/80 B |
| 4,353,565 | 10/1982 | Smith et al. | 280/80 B |

*Primary Examiner*—Richard A. Bertsch

*Attorney, Agent, or Firm*—Richards, Harris, Medlock & Andrews

[57] ABSTRACT

A vehicle (10) is disclosed which includes a power unit (14) and an end dump trailer (12). The legal payload of the trailer (12) is increased by using a sliding pedestal (30) mounting rear tandem wheel unit (18). The pedestal (30) is slidable to a forward position for dumping and to a rearward position for traveling on a public highway. The unit (18) includes a pedestal (30) slidable along the frame (33) of the trailer body (16) on polyethylene pads (34). Cooperating frame wedges (38, 40, 42) and pedestal wedges (44, 46) wedge the pedestal (30) in the forward and rearward positions. Locking wedges (58, 60) lock the pedestal in the forward and rearward positions. Polyethylene guide blocks (68) align the pedestal (30) with the frame (33).

16 Claims, 6 Drawing Figures

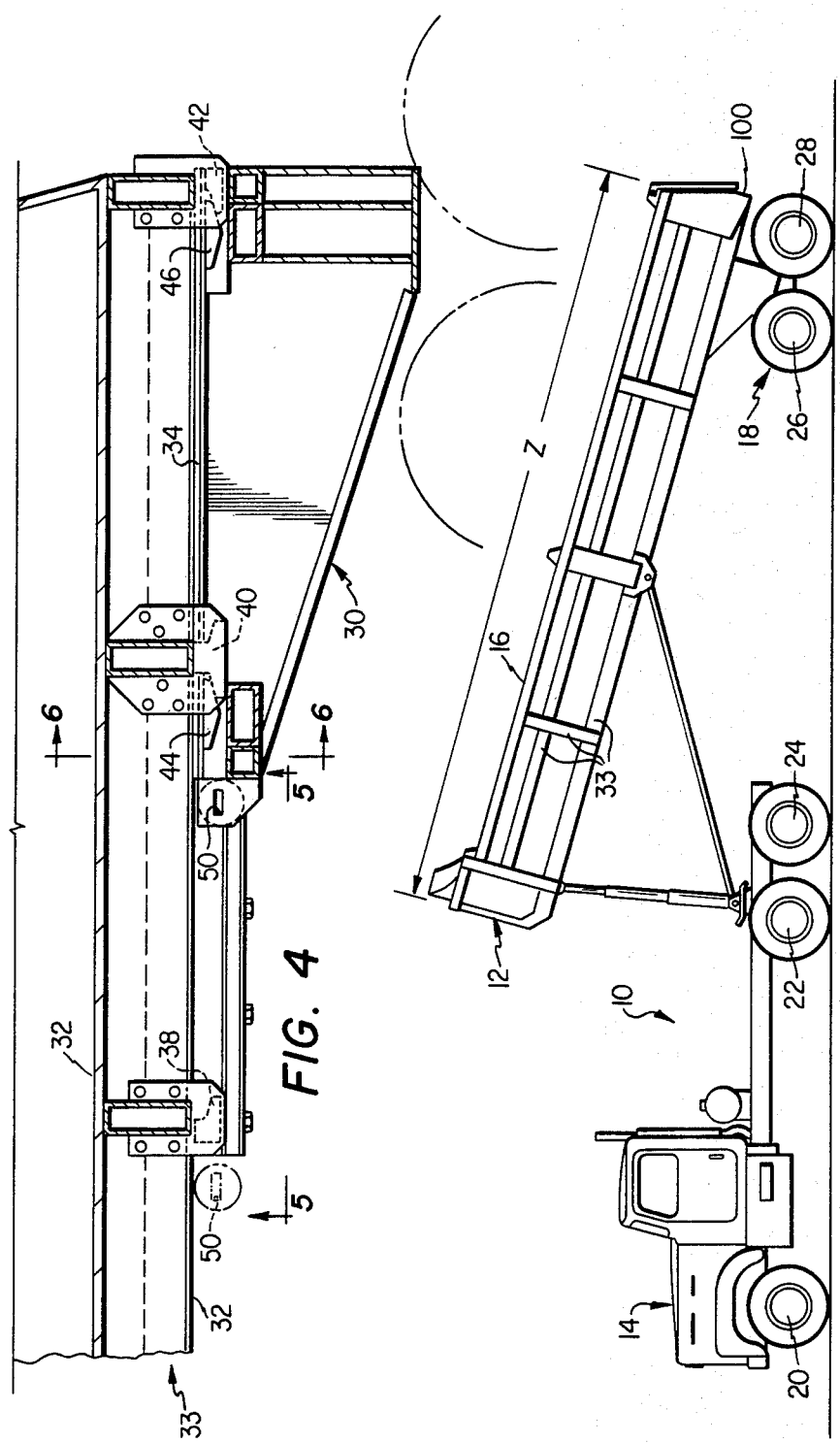

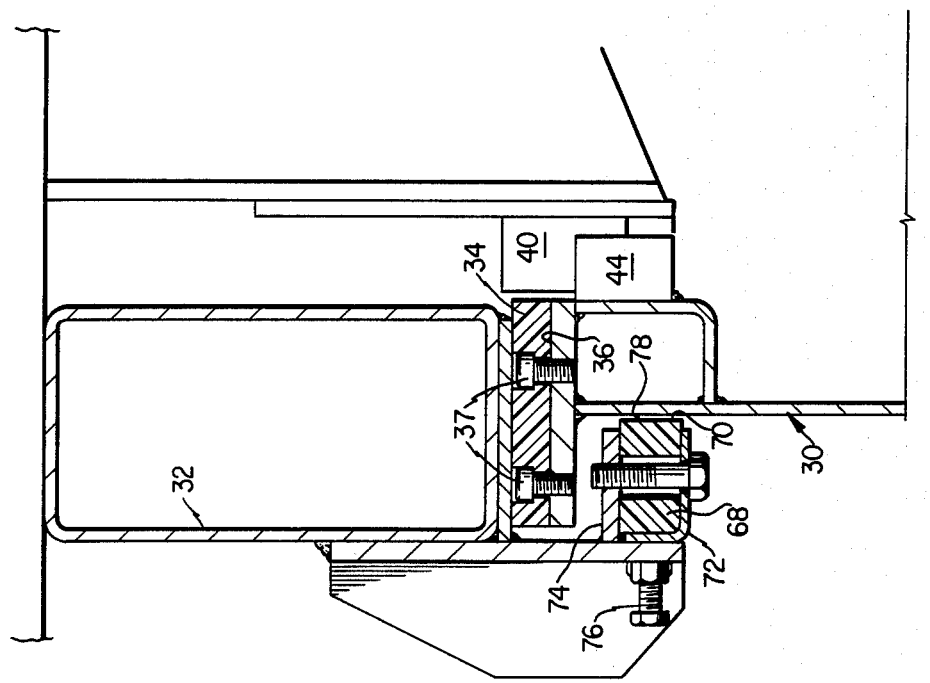
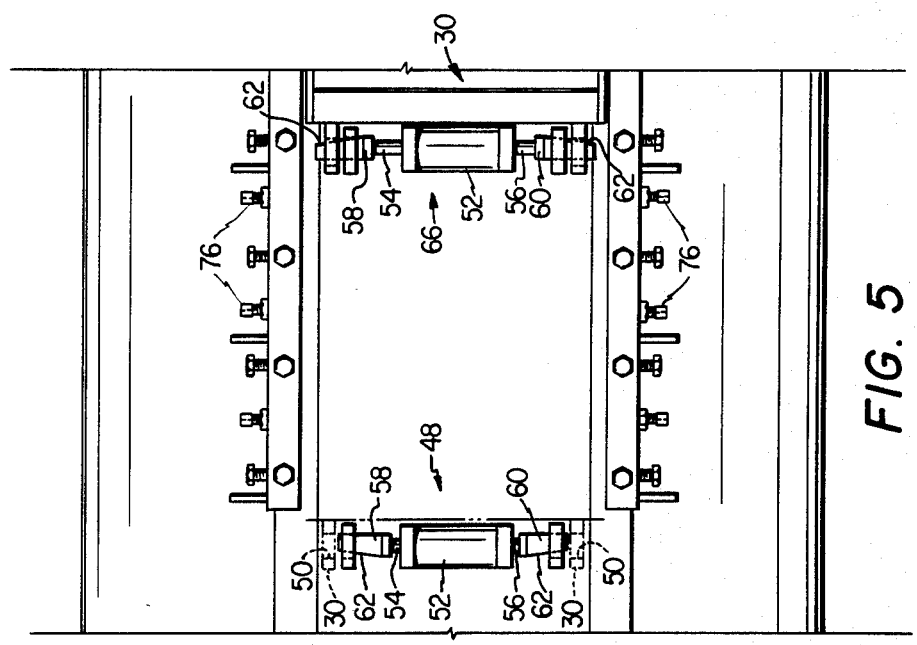

METHOD AND APPARATUS FOR VARYING A VEHICLE WHEELBASE

TECHNICAL FIELD

This invention relates to payload bearing vehicles, and in particular to a variable wheelbase vehicle permitting transport of increased payload.

BACKGROUND OF THE INVENTION

Many jurisdictions within the United States and foreign countries have established regulations for the gross weight of a highway vehicle, such as a semi-trailer. The gross weights permitted are typically related to the vehicle size, and particularly to the vehicle wheelbase.

In particular, the gross weight permitted is often related to the number of axles on the vehicle and the wheelbase defined as the distance between selected axles. In the common semi-trailer type configuration including a power unit and a trailer, the wheelbase can be measured a number of ways. The wheelbase can be measured between the leading and trailing axles of the trailer, between the leading drive axle of the power unit and the trailing axle of the trailer or between the steering axle of the power unit and the trailing axle of the trailer.

A careful consideration of the axles used to determine the allowable gross vehicle weight is necessary to pick the optimal wheelbase measurement to permit the maximum payload to be carried in the vehicle. In optimizing this measurement, the total weight and weight distribution of the power unit and trailer must be considered.

Because the power unit and trailer of the vehicle are commonly designed and constructed to carry a much greater payload than that permitted by law, it is desired to design a vehicle for the maximum legal wheelbase, permitting a large payload to be carried, while minimizing the problems associated with lengthening the length of the vehicle, such as stability and turning radius.

One commonly used vehicle is the "end dump" trailer, which is a dump truck designed for semi-trailer operation. The end dump trailer will typically include a trailer body for containing the payload, a pivotal frame supporting the body and a rear tandem wheel unit. The pivotal frame is pivoted to permit the trailer body to be tilted to an angle of approximately 50° from the horizontal for dumping operations. The rear tandem wheel unit supports the rear of the trailer. The drive axles of the power unit will support the front of the trailer. In operation, a body length of about 32 feet has been found to be a desirable maximum figure. Trailer body lengths of 35 and 37 feet are believed in the industry to be nonstable in the dumping position. Therefore, a need exists to design an end dump trailer which inclues a trailer body length that is acceptable in the industry while maximizing the permitted gross vehicle weight and payload under the law.

SUMMARY OF THE INVENTION

In accordance with one aspect of the present invention, a vehicle is provided which is supported by at least one axle. The vehicle comprises a frame and a pedestal for supporting selected ones of the axles. Structure is provided for supporting the pedestal on the frame for slidable motion of the pedestal along the frame between a forward position and a rearward position. Pedestal mounted wedge structure and frame mounted wedge structure are provided with the wedge structures moving into a wedging position when the pedestal is in the forward and rearward positions to wedge the pedestal in the forward and rearward positions for vehicle operation. Locking structure is provided for urging the pedestal and vehicle mounted wedge structures into the wedging position when the pedestal is in the forward and rearward positions.

In accordance with another aspect of the present invention, the vehicle comprises an end dump trailer. Dumping of the trailer payload is permitted when the pedestal is in the forward position and traveling of the trailer is permitted when the pedestal is in the rearward position.

In accordance with another aspect of the present invention, a method for varying the position of an axle along a vehicle, the vehicle having a frame, is provided. The method includes the steps of mounting the axle on a pedestal and supporting at least a portion of the vehicle with the pedestal and axle with the pedestal being slidable along the frame of the vehicle between forward and rearward positions. The method further includes the steps of wedging cooperating wedge structure mounted on the frame and pedestal when the pedestal is in the forward and rearward positions for vehicle operation and locking the pedestal in the forward and rearward positions with the frame and pedestal mounted wedge structures in the wedged position.

DESCRIPTION OF THE DRAWINGS

A more complete understanding of the invention and its advantages will be apparent from the following Detailed Description when taken in conjunction with the accompanying Drawings, in which:

FIG. 3 is a side view of the power unit and end dump trailer with the trailer body in the tilted position for dumping the payload;

FIG. 4 is a side view of a portion of the trailer illustrating the wedge structure;

FIG. 5 is a top view of a portion of the trailer taken along line 5—5 in FIG. 4 with the trailer body removed to illustrate the locking structure; and FIG. 6 is a vertical cross section of the trailer taken along line 6—6 in FIG. 4.

DETAILED DESCRIPTION

Figure 1:
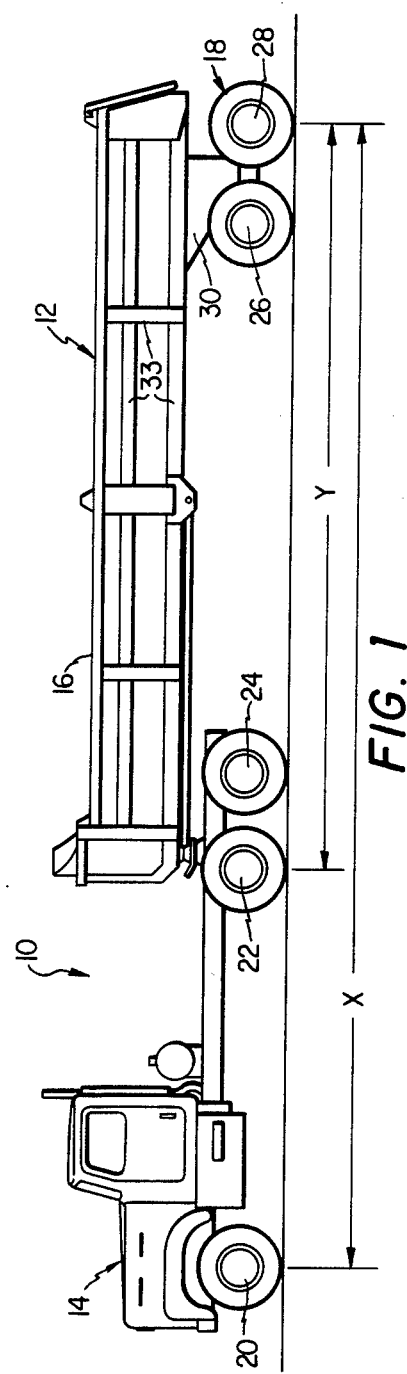
FIG. 1 is a side view of a power unit and end dump trailer illustrating the rear tandem wheel unit in the forward position for dumping operation.
Figure 2:
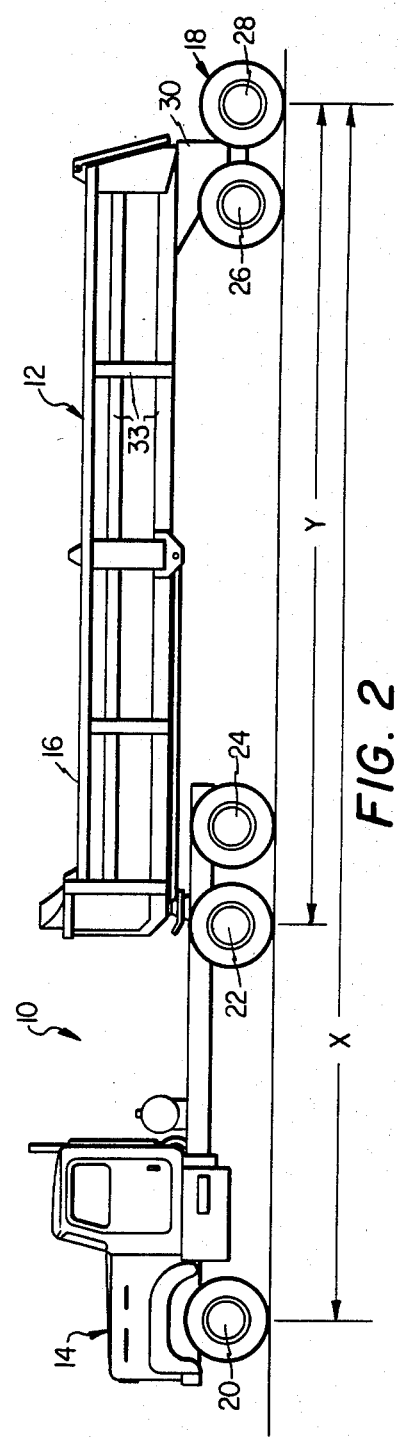
FIG. 2 is a side view of the power unit and end dump trailer with the rear tandem wheel unit in the rearward position for highway travel.

Referring now to the Drawings, wherein like reference characters designate like or corresponding parts throughout several views, and in particular to FIGS. 1-3, a vehicle 10 is illustrated which includes an end dump trailer 12 and a power unit 14. The end dump trailer 12 is in the horizontal position shown in FIGS. 1 and 2 during loading of the payload and while traveling on the highway. When the payload is to be dumped, a hydraulic mechanism in the end dump trailer 12 will pivot the trailer body 16 about a pivotal connection to the rear tandem wheel unit 18 to an angle up to approximately 50° from the horizontal.

As set forth in the background of the invention, local jurisdictions have restrictions on gross vehicle weight based on certain lengths between axles on a vehicle. The vehicle 10 illustrated has a steering axle 20 and forward and rearward drive axles 22 and 24 on the power unit 14. Trailer 12 has a forward trailing axle 26 and a rearward trailing axle 28.

As noted previously, common wheelbase measurements for determining the gross weight permitted are between the steering axle of the power unit and the last trailing axle of the trailer, distance X in FIGS. 1 and 2, and between the forward drive axle of the power unit and the last trailing axle of the trailer, distance Y in FIGS. 1 and 2. The following table is an example of one juristiction's regulations regarding wheelbase and gross vehicle weight. In this table, the number of axles is the total number of axles between the axles at which the wheelbase is measured, including the measurement axles. For example, the distance X in FIGS. 1 and 2 includes 5 axles. The distance Y includes 4 axles.

TABLE 1

| Wheelbase Distance in Feet | Allowable Gross Vehicle Weight (lb) 4 Axles | Allowable Gross Vehicle Weight (lb) 5 Axles |
| --- | --- | --- |
| 26 | 60,600 | 64,000 |
| 27 | 61,500 | 65,000 |
| 28 | 62,500 | 65,500 |
| 29 | 63,450 | 66,000 |
| 30 | 64,400 | 66,500 |
| 31 | 65,350 | 67,500 |
| 32 | 66,300 | 68,000 |
| 33 | 67,250 | 68,500 |
| 34 | 68,200 | 69,000 |
| 35 | 69,150 | 70,000 |
| 36 | 70,100 | 70,500 |
| 37 | 71,050 | 71,000 |
| 38 | 72,000 | 71,500 |
| 39 | 72,000 | 72,500 |
| 40 | 72,000 | 73,000 |
| 41 | 72,000 | 73,500 |
| 42 | 72,000 | 74,000 |
| 43 | 72,000 | 75,000 |
| 44 | 72,000 | 75,500 |
| 45 | 72,000 | 76,000 |
| 46 | 72,500 | 76,500 |
| 47 | 73,500 | 77,500 |
| 48 | 74,000 | 78,000 |
| 49 | 74,500 | 78,500 |
| 50 | 75,500 | 79,000 |
| 51 | 76,000 | 80,000 |

As can be seen, this gross weight table is independent of the actual length Z of the trailer body 16 of the vehicle 10 as shown in FIG. 3. The gross weight table therefore provides an artificial limit to the payload carrying capacity of the vehicle 10.

As also noted in the Background of the Invention, it has been found that many vehicle users prefer a trailer body length Z not exceeding 32 feet. In the normal construction of a 32 foot trailer body 16, the rear tandem wheel unit 18 must be positioned relative to the body as illustrated in FIGS. 1 and 3 to permit the trailer body 16 to pivot upward for dumping of the payload. If the rear tandem wheel unit 18 was permanently mounted behind the dumping lip 100 of the trailer body 16 seen in FIG. 3, a protective shield or ramp would be required to protect the unit 18 from damage from the payload during dumping. Also, the maximum dumping angle of the trailer body 16 generally decreases as wheel unit 18 is positioned further back on the trailer 12.

In one vehicle 10 having a trailer body length Z of 32 feet, the distance X is 46 foot 10 inches and the distance Y is 30 foot 6 inches. As can be readily found on the gross weight Table I, a length X of 46 foot 10 inches would permit a gross vehicle weight of 77,500 pounds. The distance X of 30 foot 6 inches would permit a gross vehicle weight of 65,350 pounds. It will be recalled that the gross vehicle weight includes the actual weight of the trailer and power unit that is supported by the axles within the measured wheelbase. Therefore, in evaluating the gross vehicle weight from Table I using the distance Y, the weight of the vehicle 10 on the steering axle 20 would not form part of the gross vehicle weight.

Table 2 illustrates the weight in pounds on the steering axle, drive axles and trailing axles for one vehicle having a 32 foot long trailer body 16.

TABLE 2

|  | Total Weight | Weight on Steering Axle | Weight on Drive Axles | Weight on Trailing Axles |
| --- | --- | --- | --- | --- |
| Power Unit | 16,865 | 8,777 | 8,088 | 0 |
| Trailer | 10,337 | 160 | 2,552 | 7,625 |
| Payload | 48,552 | 1,467 | 23,360 | 23,725 |
| Combination | 75,754 | 10,404 | 34,000 | 31,350 |

As can be seen, the distance Y would be used to measure the wheelbase to achieve the maximum payload for vehicle 10. The gross vehicle weight measured between axles 22 and 28 would exactly equal that permitted by Table 1. If the wheelbase X, between axles 20 and 28, were used to measure the wheelbase, the permitted gross vehicle weight would be exceeded.

In accordance with the teachings of the present invention, the pedestal 30 supporting the rear tandem wheel unit 18 on the trailer 12 is slidable along the length of the trailer between the forward position shown in FIGS. 1 and 3 and the rearward position shown in FIG. 2. By sliding the pedestal 30 into the rearward position, the wheelbase X on the vehicle having a 32 foot long trailer body 16 is increased to 49 foot 10 inches and the wheelbase Y is increased to 33 foot 6 inches. The allowable gross vehicle weight is calculated as follows in Table 3.

TABLE 3

|  | Total Weight | Weight on Steering Axle | Weight on Drive Axles | Weight on Trailing Axles |
| --- | --- | --- | --- | --- |
| Power Unit | 16,865 | 8,777 | 8,088 | 0 |
| Trailer | 10,537 | 182 | 2,855 | 7,500 |
| Payload | 51,029 | 1,472 | 23,057 | 26,500 |
| Combination | 78,431 | 10,431 | 34,000 | 34,000 |

Again, selecting the wheelbase Y between axles 22 and 28 provides the maximum payload within the guidelines set by Table 1. It will be observed that the legal payload has been increased by 2,477 pounds compared to the analysis of Table 2. This increase is permitted simply by moving the rear tandem wheel unit 18 and pedestal 30 from the forward position to the rearward position for traveling over a public highway where the jurisdiction has a weight table such as Table 1.

The operation of trailer 12 is better described with reference to FIGS. 4–6. With reference to FIGS. 4 and 6, the pedestal 30 slidably contacts the bottom of channels 32 forming part of the frame 33 of the trailer body 16 and located on either side of the trailer body. Polyethylene pads 34 are bolted to the surface 36 of the pedestal 30 by bolts 37 proximate the channels 32 to reduce friction between the trailer body 16 and pedestal 30 and also to provide a cushioning action between the two elements.

Forward frame wedges 38, middle frame wedges 40 and rearward frame wedges 42 are positioned on either side of the trailer body 16 on the channels 32. The frame wedges 38, 40 and 42 cooperate with forward pedestal wedges 44 and rearward pedestal wedges 46. In the forward position of pedestal 30 shown in FIGS. 1 and 3, the forward pedestal wedges 44 engage the forward frame wedges 38 and the rearward pedestal wedges 46 engage a portion of the middle frame wedges 40. In the rearward position illustrated in FIGS. 2 and 4, the forward pedestal wedges 44 are engaged with a portion of the middle frame wedges 40 and the rearward pedestal wedges 46 are engaged with the rearward frame wedges 42 to wedge the pedestal to the frame 33 in the forward and rearward positions.

A forward locking assembly 48, shown in FIG. 5, is mounted on the frame 33 and cooperates with locking holes 50 formed in the pedestal 30 as shown in FIG. 4. The forward locking assembly 48 comprises a dual double acting cylinder 52 having pistons 54 and 56 shown in their retracted positions in FIG. 5. Locking wedges 58 and 60 are positioned at the end of pistons 54 and 56, respectively. When the pedestal is moved into the forward position by locking the brakes on the rear tandem wheel unit 18 and backing the power unit 14, the pistons 54 and 56 can be activated to drive the locking wedges 58 and 60 into the locking holes 50. The wedges 58 and 60 have wedge surfaces 62 which act to wedge the pedestal wedges into the frame wedges when the pistons 54 and 56 move outwardly from the dual cylinder 52. In the forward position, the vehicle 10 is adapted for payload dumping. In fact, since the positioning of a rear tandem wheel unit in prior vehicle designs was a compromise between wheel base and dumping requirements, the forward position of wheel unit 18 could be forward of the wheel unit placement on the prior vehicle, thereby possibly increasing the maximum dumping angle of the trailer body 16 over the maximum dumping angle in the prior vehicles.

A rearward locking assembly 66 is also mounted on the frame 33. The rearward locking assembly 66 comprises the identical elements of forward locking assembly 48 but with the wedge surfaces 62 oriented in the direction opposite those in the forward locking assembly 48. To move the pedestal 30 into the rearward position, the brakes on unit 18 are again locked and the power unit 14 is moved forward. The rearward locking assembly 66 will act to wedge the pedestal wedges into the frame wedges when the pedestal 30 is in the rearward position for travel on a public highway.

The pedestal 30 is aligned with the frame 33 by polyethylene blocks 68 having guide surfaces 70 as best shown in FIG. 6. The blocks 68 are secured to angle members 72 which are bolted to a flange 74 on each side of the frame 33 as best seen in FIG. 6. The angle member 72 and blocks 78 can be adjusted inwardly toward the pedestal or outwardly from the pedestal by adjusting screws 76. Typically, a small gap 78 will be maintained between the guide surfaces 70 and the pedestal 30. The polyethylene blocks 68 will maintain the pedestal 30 aligned with the frame 33 both in the forward and rearward positions and while moving between the positions.

In the preferred construction, the dual cylinders 52 in both the forward and rearward locking assemblies 48 and 66 are double acting and operated by air pressure. This will permit the locking assemblies to be operated by the vehicle operator from within the cab of the power unit 14.

While the vehicle 10 illustrated and described above is an end dump trailer, it will be apparent that the teachings of the present invention can be applied to other vehicles subject to similar gross vehicle weight limitations where the slidable nature of the pedestal 30 can increase the legal wheelbase of the vehicle to increase the usable payload. It is also apparent that the design of the trailer 12 with the sliding pedestal 30 can be adapted for any purpose where the design would prove useful.

Although only a single embodiment of the present invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the scope and spirit of the invention.

I claim:

1. A vehicle supported by at least one axle, comprising:

a frame;

a pedestal for supporting selected ones of said axles;

means for supporting said pedestal on said frame for slidable motion of said pedestal along said frame between a forward position and a rearward position;

pedestal mounted wedge structure;

frame mounted wedge structure, the pedestal mounted wedge structure and frame mounted wedge structure moving into a wedging position when the pedestal is in the forward and rearward positions to wedge the pedestal to the frame in the forward and rearward position for vehicle operation;

locking means for urging the pedestal mounted wedging structure and frame mounted wedging structure into the wedging position when the pedestal is in the forward and rearward positions;

the vehicle being an end dump trailer, the forward position of the pedestal permitting dumping of the end dump trailer payload while the rearward position of the pedestal is employed for trailering, at least one of said axles being positioned rearward of the frame when the pedestal is in the rearward position.

2. The vehicle of claim 1 wherein said locking means comprises locking wedge structure.

3. The vehicle of claim 1 wherein said locking means are controlled by air pressure so that the vehicle operator can operate the locking means from a remote location.

4. The vehicle of claim 1 further comprising guide means for aligning the pedestal and frame in the forward and rearward positions.

5. The vehicle of claim 1 wherein the selected ones of said axles are forward of the dumping lip of the end dump trailer when the pedestal is in the forward position.

6. The vehicle of claim 1 wherein the forward position of the pedestal is selected to optimize the maximum dumping angle of the end dump trailer.

7. A vehicle supported by at least one axle, comprising:

a frame;

a pedestal for supporting select ones of said axles;

means for supporting said pedestal on said frame for slidable motion of said pedestal along said frame between a forward position and a rearward position;

pedestal mounted wedge structure including a forward pedestal wedge structure and a rearward pedestal wedge structure;

frame mounted wedge structure including forward frame wedge structure, middle frame wedge structure and rearward frame wedge structure, the forward and rearward pedestal wedge structures moving into a wedging position with the forward and middle frame wedge structures of the frame in the forward position to wedge the pedestal in the forward position for vehicle operation, the forward and rearward pedestal wedge structures moving into a wedging position with the middle and rearward frame wedge structures on the frame when the pedestal is in the rear position to wedge the pedestal in the rearward position for vehicle operation;

guide means for aligning the pedestal and frame in the forward and rearward positions;

locking means for urging the frame wedge structures and pedestal wedge structures into the wedging position when the pedestal is in the forward and rearward positions;

the vehicle comprising an end dump trailer, the pedestal permitting dumping of the payload of the end dump trailer when in the forward position and increasing the effective legal payload of the trailer when located in the rearward position.

8. The vehicle of claim 7 wherein said pedestal includes at least one locking hole and said locking means comprises at least one forward locking wedge mounted on said frame for engaging the locking hole on said pedestal when the pedestal is in the forward position to lock the pedestal in the wedging position with the frame in the forward position and at least one rearward locking wedge for engaging the locking hole on said pedestal when the pedestal is in the rearward position to lock the pedestal in the wedging position with the frame in the rearward position.

9. The vehicle of claim 8 wherein said locking means further comprises double acting fluid cylinders for moving the locking wedges into and out of engagement with the locking hole.

10. The vehicle of claim 7 wherein the select ones of said axles are forward of the dumping lip of the end dump trailer when the pedestal is in the forward position.

11. The vehicle of claim 7 wherein the forward position of the pedestal is selected to achieve the maximum dump angle of the end dump trailer.

12. A vehicle supported by at least one axle, comprising:
a frame;
a pedestal for supporting selected ones of said axles;
means for supporting said pedestal on said frame for slidable motion of said pedestal along said frame between a forward position and a rearward position, said means for supporting said pedestal on said frame including polyethylene material positioned between said pedestal and frame for reducing sliding friction therebetween;
forward pedestal wedges mounted on either side of the pedestal and rearward pedestal wedges mounted on either side of the pedestal;
forward, middle and rearward frame wedges mounted on the frame on either side of the frame, the forward pedestal wedges and forward frame wedges and the rearward pedestal wedges and middle frame wedges moving into a wedging position when the pedestal is in the forward position to wedge the pedestal in the forward position for vehicle operation, the forward and rearward pedestal wedges and middle and rearward frame wedges moving into a wedging position when the pedestal is in the rearward position for vehicle operation;
guide structure mounted on said frame including polyethylene blocks having a guide surface thereon on either side of the pedestal for aligning the pedestal with the frame in the forward and rearward positions and while the pedestal slides between the forward and rearward positions;
a forward locking assembly mounted on said frame comprising a dual double acting cylinder with locking wedges positioned at the ends of the pistons thereof for engaging locking holes formed on either side of the pedestal for locking the pedestal in the forward position and a rearward locking assembly mounted on said frame comprising a dual double acting cylinder with locking wedges positioned at the end of the pistons thereof for engaging the locking holes in the pedestal for locking the pedestal in a rearward position; and
a trailer body supported on said frame for carrying a payload, the vehicle forming an end dump trailer, at least one of said selected axles being rearward of the trailer body when the pedestal is in the rearward position to increase the effective legal payload of the trailer body by increasing the wheel base of the vehicle when towed by a power unit.

13. The vehicle of claim 12 wherein said dual double acting cylinders are operated by air pressure from within the cab of the power unit.

14. The vehicle of claim 12 wherein the selected ones of said axles are forward of the dumping lip of the trailer body to protect the axles.

15. The vehicle of claim 12 wherein the forward position of the pedestal is selected to optimize the maximum dump angle of the end dump trailer.

16. A method for varying the position of an axle along an end dump trailer having a trailer body is provided, the trailer having a frame, comprising the steps of:
mounting the axle on a pedestal;
supporting at least a portion of the trailer with the pedestal and axle with the pedestal being slidable along the frame of the trailer between forward and rearward positions;
wedging cooperating wedge structure mounted on the frame and pedestal when the pedestal is in the forward and rearward positions for trailer operation; and
locking the pedestal in the forward and rearward positions with the frame and pedestal mounted wedge structure in the wedged position, the pedestal being in the forward position for dumping the end dump trailer and being in the rearward position for movement along the highway to increase the legal load that can be carried by the trailer body relative to the legal load which could be carried with the pedestal in the forward position.

* * * * *

UNITED STATES PATENT AND TRADEMARK OFFICE
CERTIFICATE OF CORRECTION

PATENT NO.  : 4,531,753
DATED       : July 30, 1985
INVENTOR(S) : W. Glen Hicks

It is certified that error appears in the above-identified patent and that said Letters Patent is hereby corrected as shown below:

Column 1, line 54, change "inclues" to --includes--.

Column 7, line 19, change "rear" to --rearward--.

Signed and Sealed this

Sixth Day of May 1986

[SEAL]

Attest:

Attesting Officer

DONALD J. QUIGG

Commissioner of Patents and Trademarks